(12) United States Patent
Casasnovas et al.

(10) Patent No.: US 11,412,764 B2
(45) Date of Patent: Aug. 16, 2022

(54) REDUCED CALORIE FOOD PRODUCT AND METHODS OF MAKING

(71) Applicant: Tropicana Products, Inc., Bradenton, FL (US)

(72) Inventors: Johnny Casasnovas, Barrington, IL (US); Yongsoo Chung, Barrington, IL (US); Juan Gonzalez, Barrington, IL (US); Steven Havlik, Bradenton, FL (US); Jeffrey D. Mathews, Naperville, IL (US); Taehyung Yi, Barrington, IL (US)

(73) Assignee: Tropicana Products, Inc., Bradenton, FL (US)

( * ) Notice: Subject to any disclaimer, the term of this patent is extended or adjusted under 35 U.S.C. 154(b) by 147 days.

(21) Appl. No.: 16/555,278

(22) Filed: Aug. 29, 2019

(65) Prior Publication Data

US 2021/0059279 A1  Mar. 4, 2021

(51) Int. Cl.
*A23L 2/84* (2006.01)
*A23L 33/20* (2016.01)
*A23L 2/72* (2006.01)

(52) U.S. Cl.
CPC .............. *A23L 2/84* (2013.01); *A23L 2/72* (2013.01); *A23L 33/20* (2016.08)

(58) Field of Classification Search
CPC ... A23L 2/087; A23L 2/72; A23L 2/84; A23L 33/20
See application file for complete search history.

(56) References Cited

U.S. PATENT DOCUMENTS

| | | | |
|---|---|---|---|
| 8,168,242 B2 | 5/2012 | Henderson et al. |
| 8,790,734 B2 | 7/2014 | Cetrulo et al. |
| 9,220,291 B2 | 12/2015 | Subramaniam et al. |
| 9,241,509 B2 | 1/2016 | Subramaniam et al. |
| 9,375,027 B2 | 6/2016 | Katzir et al. |
| 9,730,465 B2 | 8/2017 | Kambouris |
| 2004/0234658 A1 | 11/2004 | Bonnet et al. |
| 2008/0044504 A1 | 2/2008 | Komaki et al. |
| 2013/0216652 A1 | 8/2013 | Sans-Valero et al. |

(Continued)

FOREIGN PATENT DOCUMENTS

| | | |
|---|---|---|
| EP | 1005795 | 6/2000 |
| WO | 2012059554 | 5/2012 |
| WO | 2018078623 | 5/2018 |

OTHER PUBLICATIONS

Nguyen et al. (Biotechnol Lett (2015) 37:711-716). (Year: 2015).*

(Continued)

*Primary Examiner* — Subbalakshmi Prakash
(74) *Attorney, Agent, or Firm* — Barnes & Thornburg LLP; G. Peter Nichols

(57) ABSTRACT

A reduced calorie nutrient enriched food product is produced by converting sucrose to monosaccharides and by selectively separating high molecular weight nutrients and sucrose in a food product such as a juice. The sucrose may be converted to non-digestible oligosaccharides. The process may also include separating a feed juice into a solids-rich fraction and a clarified juice fraction; treating the clarified juice fraction to form a high molecular weight-rich and oligosaccharide-rich fraction that can be combined with the solids-rich fraction to form a reduced calorie nutrient enriched liquid.

13 Claims, 5 Drawing Sheets

(56) References Cited

U.S. PATENT DOCUMENTS

2014/0377421 A1\* 12/2014 Kambouris .............. A23L 2/72
                                                        426/271
2017/0332670 A1\* 11/2017 Ichikawa ................ A23L 29/06
2018/0020702 A1\*  1/2018 Loetzbeyer ............. A23L 2/84
                                                        426/52

OTHER PUBLICATIONS

International Search Report and Written Opinion dated Sep. 24, 2020 in PCT/US2020/038724.

Johansson et al., "Oligosaccharide Synthesis in Fruit Juice Concentrates Using a Glucansucrase FromLactobacillusreuteri180," Food and Bioproducts Processing, Institution of Chemical Engineers, Rugby, GB, vol. 98, Jan. 25, 2016.

The Technology—Better Juice, https://www.better-juice.com/the-technology-1, Jul. 17, 2019.

Robert A. Rastall & Christopher Bucke (1992) Enzymatic Synthesis of Oligosaccharides, Biotechnology and Genetic Engineering Reviews, 10:1, 253-282, DOI:10.1080/02648725.1992.10647890.

International Preliminary Report on Patentability dated Mar. 1, 2022 in PCT/US2020/038724.

\* cited by examiner

REDUCED CALORIE FOOD PRODUCT AND METHODS OF MAKING

The present disclosure generally relates to reduced calorie food products containing native desired nutrients and methods of making such food products.

BACKGROUND

Juices derived from fruits, vegetables, or a combination of fruits and vegetables typically include native sugars as well as plant-based nutrients. The nutrients can include, for example, proteins, vitamins, polyphenols, and minerals. Because of the relatively low concentration of these nutrients in juice, a comparatively large amount of juice must be consumed to ingest a meaningful amount of certain nutrients. However, the presence of native sugars in plant-based juices, particularly fruit juices, results in the unintended consumption of sugar that increases with the amount of juice consumed.

Currently however, consumers prefer products that are perceived as healthier and have a reduced sugar and thus calorie content. U.S. Pat. No. 9,241,509 describes a process for forming a reduced calorie juice where a feed juice is treated by one or more separation processes to selectively remove sucrose from the feed juice. Unfortunately, an unintended effect of these separation processes was the removal of beneficial nutrients present in the feed juice leading to a nutrient depleted but low calorie juice.

It is desirable to provide a natural, reduced-calorie beverage without the negative characteristics of conventional low-calorie beverages. Accordingly, the present disclosure provides improved methods for isolating juice fractions that can be used to form a beverage that has a higher nutrient-to-carbohydrate ratio than the feed juice.

SUMMARY

Accordingly to the described embodiments, processes and sub-systems useful in the described processes relate to reducing calories in food products while maintaining a substantial portion of the desired nutrients. The food products can be a juice such as a fruit or a vegetable juice. In one aspect, the caloric content of the juice is reduced by selectively removing more sucrose than primary sugars. Primary sugars include, for example, glucose and fructose. An acceptable flavor profile with a high perceived sweetness per calorie can be achieved since the primary sugars have a higher perceived sweetness than sucrose.

According to one embodiment of the disclosed process, the molecular weight of sugars in a clarified juice fraction is reduced by hydrolysis to form monosaccharides. Thereafter, the clarified juice fraction is separated into a high molecular weight nutrient (HMWN) rich fraction and high molecular weight nutrient depleted fraction.

In one aspect, the HMWN-rich fraction contains a greater amount of sucrose than the HMWN-depleted fraction and in this aspect the HMWN-rich fraction is directed to a bioconversion unit where the sucrose is converted into fructooligosaccharides. Thereafter, the HMWN-rich fraction containing fructooligosaccharides can be combined or mixed with the solids-rich fraction to provide a low calorie fiber and nutrient enriched liquid. The liquid can be packaged for consumption or used as an additive in other food or beverage products to increase nutritional content.

In another embodiment, a clarified juice fraction is separated into a high molecular weight nutrient rich fraction and high molecular weight nutrient depleted fraction. The high molecular weight rich fraction is subjected to a hydrolysis reaction to reduce the molecular weight of sugars to form monosaccharides and to create a mixture of the high molecular weight nutrient rich fraction and reduced molecular weight sugars.

In one aspect, the mixture of the HMWN-rich fraction and reduced molecular weight sugars is directed to a bioconversion unit where the sugars are converted into fructooligosaccharides (FOS). Thereafter, the HMWN-rich fraction containing fructooligosaccharides can be separated into a HMWN-rich and FOS-rich fraction and a HMWN-depleted and FOS depleted fraction. The HMWN-rich and FOS-rich fraction can be combined or mixed with the solids-rich fraction to provide a low calorie fiber and nutrient enriched liquid. The liquid can be packaged for consumption or used as an additive in other food or beverage products to increase nutritional content.

Advantageously, according to the described processes, certain fractions produced by the subsystems of the described processes and the finished product generally contain a reduced amount of sucrose and a desirable ratio of fructose to sucrose. As a result, a higher perceived sweetness per calorie can be achieved and thus, less or no artificial sweeteners need to be added to the final liquid to achieve an acceptable flavor profile and advantageously creating a more "natural" product.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

Unless otherwise noted in the Specification, all percentages refer to dry weight percent.

BRIEF DESCRIPTION OF THE DRAWINGS

The following description accompanies the drawings that may be useful to understand described process and system.

DESCRIPTION

Figure 1:
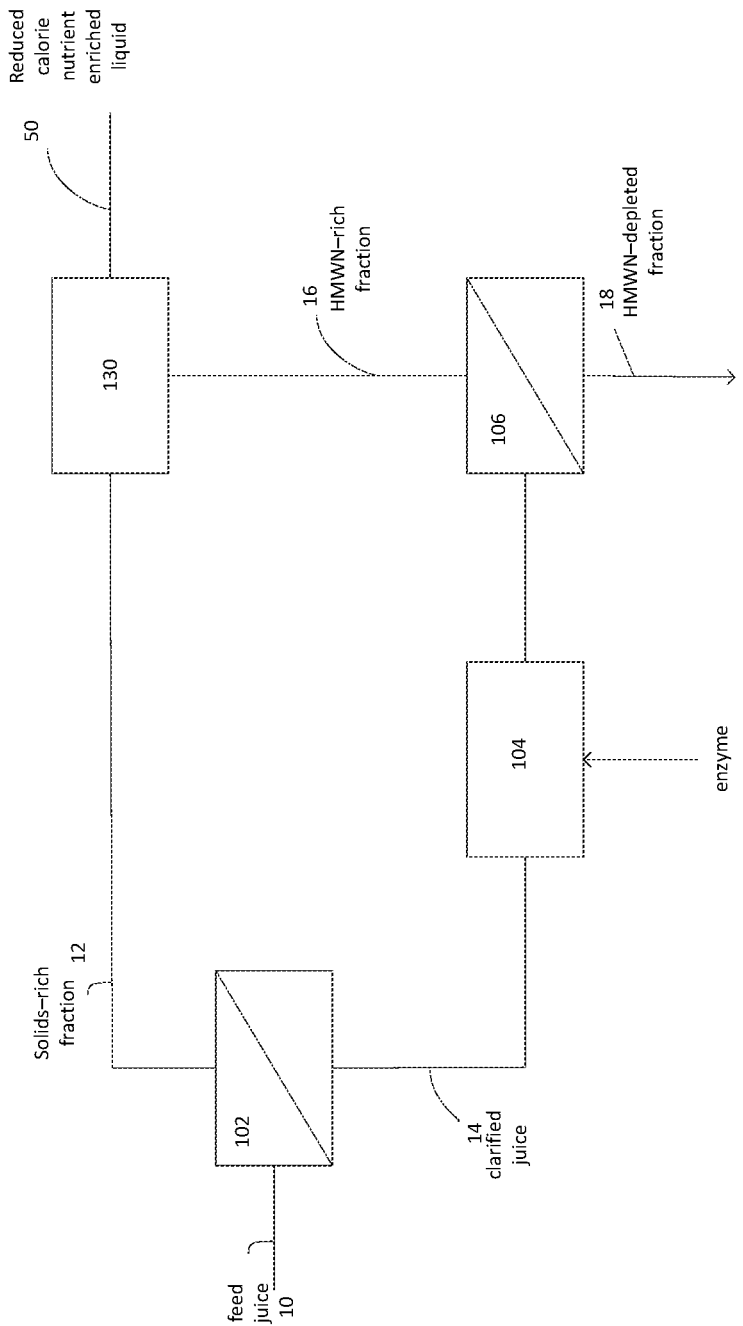
FIG. 1 is a flowchart of a process for creating a reduced calorie nutrient enriched liquid from a feed juice stream.

The disclosure provides processes for forming or creating a reduced calorie food product containing native desired nutrients, for forming or creating a reduced calorie, fiber and nutrient enhanced food product, different embodiments of sub-systems that can be used in the disclosed processes, and products formed from the processes and sub-systems.

The food product may be a liquid-based extract from fruits, vegetables, or a combination of fruits and vegetables and may be referred to in the alternative as a "plant-based juice," which is contrasted with a beverage formed from water and juice-like flavoring. The food product may have a reduced calorie content that is achieved with no or less reliance on artificial sugars than conventional low calorie beverages. In one embodiment, the low calorie beverage comprises of not-from-concentrate (NFC) or from-concentrate (FC) juices.

In one embodiment, the plant-based juice obtained by the described methods and systems typically provide a higher nutrient-to-carbohydrate ratio than plant-based juices formed from conventional processes. The plant-based juice may be consumed as a beverage or it may be added to another liquid to form a beverage with a plant-based juice component as a nutritional supplement or additive.

The plant-based juice may be formed from fruit or vegetable sources. In one embodiment, the beverage comprises citrus juices. In some embodiments, the beverage comprises a not-from-concentrate (NFC) juice. Suitable fruit and vegetable juices include but are not limited to acai, apple, apricot, aronia, artichoke, asparagus, banana, Barbados cherry (acerola cherry), beans, beet, blackberry, blueberry, boysenberry, broccoli, brussels sprouts, buckthorn, cabbage, carrot, cauliflower, cherry, choke cherry, coconut, cranberry, cucumber, currant, date, dewberry, eggplant, elderberry, fig, gooseberry, grape, grapefruit, grapes, guava, huckleberry, kiwi, kohlrabi, kumquat, leeks, lemon, lentils, lettuce, limes, loganberry, lychee, mandarin orange, mango, mulberry, olive, onion, orange, papaya, parsley, passion fruit, peach, pear, peas, persimmon, pineapple, plains berry, plum, pomegranate, pomelo, potato, prairie berry, prune, quince, radish, raspberry, rhubarb, rowan, rutabaga, Saskatoon berry, spinach, strawberry, tangelo, tangerine, tomato, turnip, watercress, watermelon, wheat grass, zucchini, or any combination thereof.

Plant-based juices include native or intrinsic plant-based nutrients as well as native or intrinsic sugars. Thus, the consumption of a plant-based juice for the nutritional benefits results in a concomitant consumption of native sugars. For example, a 12-ounce glass of grape juice has about 58 grams of sugar. A 12-ounce glass of apple juice has about 39 grams of sugar, and a 12-ounce glass of orange juice has about 33 grams of sugar.

Native or intrinsic sugars in plant-based juices include sucrose, glucose, and fructose. Native or intrinsic plant-based nutrients include among other things phenolic compounds and flavonoids such as hydroxycinnamic acids, flavanones, hydroxybenzoic acids, hesperidin, narirutin, and ferulic acid, which are known to be beneficial for health purposes. Unfortunately, some of the plant-based nutrients have a size (molecular weight) and structure that is similar to that of sucrose, which resulted in their unintended removal in separation processes that sought to remove sucrose.

Processes according to the described embodiments are able to isolate juice fractions to remove greater amounts of native sugar while maintaining as much of the native plant-based nutrients as possible. Some of the juice fractions can then be optionally recombined to form a beverage with desirable characteristics, such as a higher nutrient-to-carbohydrate ratio as compared to conventional separations techniques.

In general, the present disclosure describes methods and corresponding systems to create HMWN-rich fractions and to reducing a molecular weight of sugars derived from a plant-based feed juice stream to form a mixture containing a HMWN-rich fraction and reduced molecular weight sugars. Other beneficial methods and corresponding systems create low calorie, fiber and nutrient enriched liquids from HMWN-rich fractions and FOS-rich fractions that can be used to separately or in combination with a solids-rich fraction of the feed juice.

Referring to FIG. 1, a feed juice stream 10 is separated into a solids rich fraction 12 and a clarified juice fraction 14. The term "feed juice stream" may be used to describe a continual feed stream of a plant-based juice that could be used in a continuous process, or the term may also be used interchangeably to describe a discrete amount of a plant-based juice used in a batch process.

The separation 102 may be accomplished by any suitable process or combination of processes such as, but not limited to, centrifuging, decanting, filtering, and combinations of these.

According to one embodiment, the clarified juice fraction 14 is obtained from a plant-based feed juice stream by centrifugation followed by a size-based separations step. The centrifugation separates the centrifugate from the supernatant or clarified juice fraction In one embodiment, the centrifugate and supernatant are both subjected to a size-based separations step to form a permeate 12 and retentate 14 with the permeate being the clarified juice fraction and the retentate being the insoluble solids fraction. In another embodiment, only the supernatant is subjected to the size-based separations step to form a permeate and retentate with the permeate being the clarified juice fraction 14 and the insoluble solids fraction 12 being the combination of the retentate and the centrifugate from the previous centrifugation step.

The size-based separations step may be accomplished using any suitable filtering apparatus such as a micro-filter or a hollow fiber member to provide a separation based on a pore size between 40-60 kDa. In another embodiment, the filter has a pore size between 45-55 kDa or about 50 kDa.

The permeate or clarified juice fraction 14 may be directed to a hydrolysis reactor 104 where the clarified juice fraction 14 is enzymatically treated to hydrolyze the disaccharides to monosaccharides. In particular, the sucrose present in the clarified juice fraction 14 is hydrolyzed into monosaccharides (glucose and fructose) which reduces the molecular weight profile of the native sugars present in the clarified juice fraction 14 and which increases a size discrepancy between the native sugars and the native higher molecular weight, plant-based nutrients to facilitate subsequent size-based separations.

As one of skill will appreciate, the hydrolysis of disaccharides into monosaccharides, and in particular the hydrolysis of sucrose into glucose and fructose is typically accomplished by an enzymatic reaction. In one embodiment, the enzyme is invertase, which cleaves the O—C fructose bond in sucrose. In another embodiment, the enzyme is sucrase, which cleaves the O—C glucose bond in sucrose. In yet another embodiment, the enzymatic reaction is catalyzed by a mixture of invertase and sucrase.

The above enzymes (and other) and their use including amounts and temperatures for catalyzing the hydrolysis reaction are known and will not be described further. The enzymes may be immobilized by providing the enzymes within a matrix such as beads that can be used in a fixed bed reactor, where the liquid containing the disaccharides flow through the fixed bed reactor.

Hydrolysis reactors are known and need not be explained in detail. The reactor may be operated in a batch mode where the clarified juice fraction and enzyme(s) are mixed under suitable conditions to hydrolyze the disaccharides to monosaccharides to a desired end point, e.g., percentage of conversion and then the reaction is terminated. Alternatively, the enzymes may be immobilized on beads or other material to form a packed bed or column through which the clarified juice fraction passes for a suitable residence time to achieve the desired degree of hydrolysis.

As mentioned above, in embodiments of the method of the invention, the enzyme(s) may be immobilized before contacting the clarified juice 14. Common immobilization techniques include covalent bonding, entrapment, physical adsorption, and cross-linking.

In covalent binding enzymes are covalently linked to a support through the functional groups in the enzymes that are not essential for the catalytic activity. Oxides materials such as alumina, silica, and silicated alumina can be used for covalent binding of fructosyltransferase and dextransucrase.

Entrapment is based on the localization of an enzyme within the lattice of a polymer matrix or membrane. Entrapment methods are classified into five major types: lattice, microcapsule, liposome, membrane, and reverse micelle. The enzyme is entrapped in the matrix of various synthetic or natural polymers. Alginate, a naturally occurring polysaccharide that forms gels by ionotropic gelation is the most popular one. Also, alginate as an immobilization matrix was used in combination with gelatin to immobilize the enzymes, i.e., fructosyltransferase and dextransucrase in fibers.

Physical adsorption is the simplest and the oldest method of immobilizing enzymes onto carriers. Immobilization by adsorption is based on the physical interactions between the enzymes and the carrier, such as hydrogen bonding, hydrophobic interactions, van der Waals force, and their combinations. Furthermore, adsorption is cheap, early carried out, and tends to be less disruptive to the enzymes than chemical means of attachment.

Cross-linking uses bi- or multifunctional compounds that serve as the reagent for intermolecular cross-linking of the enzymes. Cross-linking may be used in combination with other immobilization method, mainly with adsorption and entrapment.

It is contemplated that the hydrolysis reaction could be applied to the plant-based feed juice stream 10 derived directly from the fruit and/or vegetable prior to separation 102. However, the presence of excess liquid and solid particulate matter could negatively impact the reaction time or require a larger amount of the enzymatic solution, potentially rendering the process cost-prohibitive. Thus, according to some of the described embodiments, the hydrolysis is applied to a clarified juice fraction 14 derived from the plant-based feed juice stream with at least a portion of the native insoluble solids having been removed.

The enzyme treated clarified juice is then processed to separate 106 the higher molecular weight nutrients, remaining disaccharides, and other material from the enzyme treated clarified juice 14. In one embodiment, the separation processing 106 is accomplished using filtration through a nano-filtration (NF) unit to provide a retentate which is a HMWN-rich fraction 16 and a HMWN-depleted fraction 18.

The nanofiltration may be accomplished with a membrane having a molecular weight cutoff between 190-210 Daltons, or between 195-205 Daltons. In a particular embodiment, the pore size of the membrane is about 0.0001 microns which corresponds to a molecular weight cutoff of about 200 Daltons.

In one embodiment, the HMWN-rich fraction 16 can be combined with the solids-rich fraction 12 to provide a reduced, i.e., low or lower calorie nutrient enriched liquid 50. The fractions can be combined in any known manner such as a mixing vessel 130, a mixing valve, a tank, or any other equipment to provide the desired amounts (desired ratio) of the solids-rich fraction 12 and HMWN-rich fraction 16 in the lower calorie nutrient enriched liquid 50. It will be appreciated that the lower calorie nutrient enriched liquid 50 will have a ratio of nutrients to sugars that is greater than the feed juice 10. The HMWN-depleted fraction 18 can be disposed of or processed further as will be described later.

In another embodiment, the HMWN-rich fraction 16 can be subjected to subsequent diafiltration (not shown) to further concentrate the high molecular weight nutrients (and decrease the sugar content). For example, the diafiltration can accomplished by feeding a portion of the HMWN-rich fraction 16 into a vessel for mixing with a diluent. The diluent may be pure water or the HMWN-depleted fraction 18. The diluted HMWN-rich fraction 16 can then be subjected to a nanofiltration step (not shown) similar to that described above with respect to the separator 106. For example, the nanofiltration step may include the use of a membrane with a molecular weight cutoff between 190-210 Daltons, or with a molecular weight cutoff between 195-205 Daltons, or with molecular weight cutoff of about 200 Daltons. Two or more diafiltration steps may be added in series with each successive diafiltration treatment further concentrating or purifying the high molecular weight nutrients.

It is contemplated that the concentrated or purified high molecular weight nutrients could be combined with the solids-rich fraction or could be used in other food products or beverages to provide nutrients.

Figure 2:
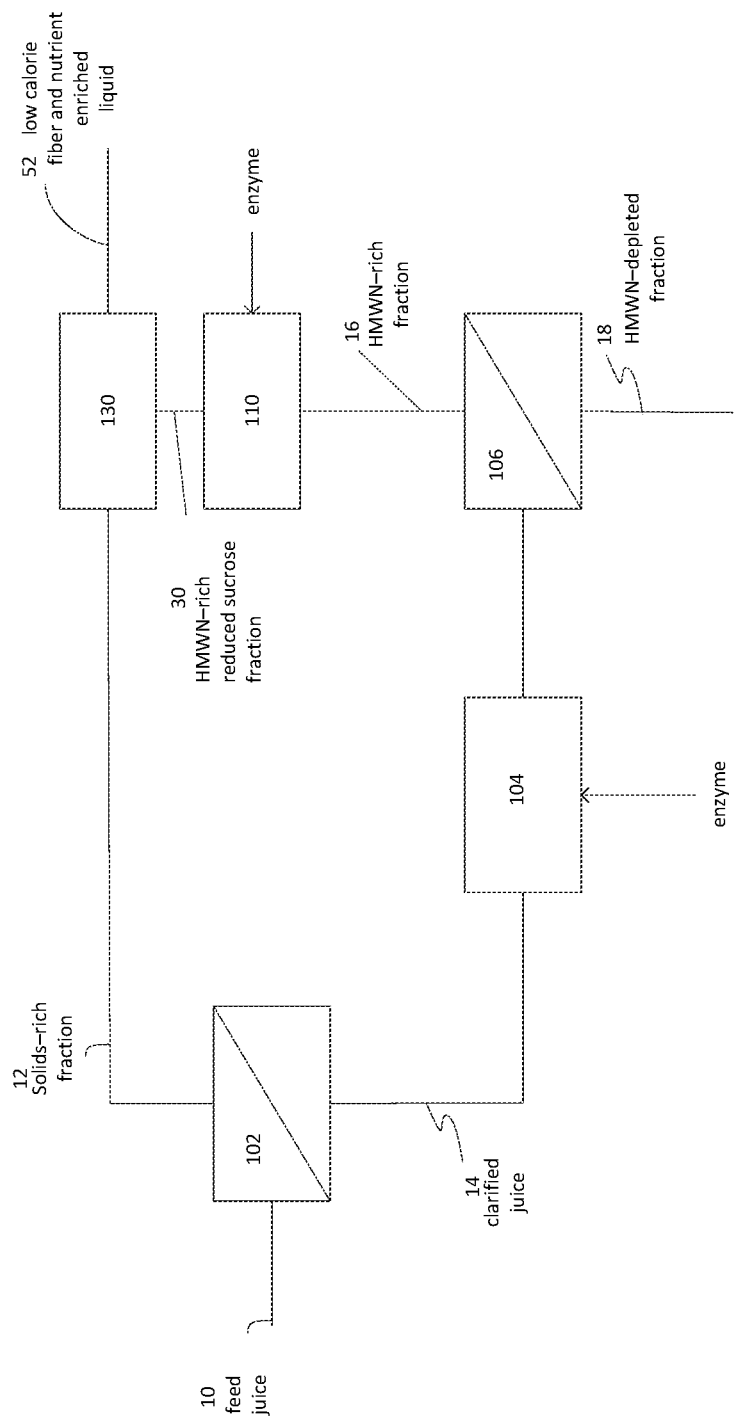
FIG. 2 is a flowchart of a process for creating a reduced calorie, fiber and nutrient enriched liquid from a feed juice stream according to one embodiment.

Turning now to FIG. 2, an alternative embodiment of the process is shown. Portions of this process are the same as that described in FIG. 1 and thus, those portions will not be described in detail. In this embodiment, the HMWN-rich fraction, which also contains sucrose, glucose, and fructose is directed to a bioconversion unit 110 where the sugars are converted to oligosaccahrides.

Accordingly, the HMWN-rich fraction 16 is subjected to a bioconversion step 110 to convert the sucrose, fructose, and glucose into soluble dietary fibers, e.g., non-digestible oligosaccharides, such as fructo-oligosaccharides (FOSs), galacto-oligosaccaharides, and gluco-oligosaccharides to form a more nutritional product.

FOSs belong to the group of prebiotics because of their indigestibility nature. Prebiotics are defined as non-digestible food ingredients that beneficially affect the host by stimulating the growth and/or activity of beneficial bacteria in the colon. FOSs have Generally Recognized As Safe (GRAS) status.

Gluco-oligosaccharides are recognized as non-digestible oligosaccharides (NDOs) which are produced by enzymatic reaction of a glucosyltransferase. When a specific glucosyltransferase such a dextransucrase is used in the presence of an acceptor such as maltose or glucose and sucrose as D-glucosyl donor, a-gluco-oligosaccharides are obtained, which in some cases contain α-1,2 and α-1,6 glucosidic bonds. These a-gluco-oligosaccharides are resistant to attack by the digestive enzymes in humans and animals and therefore are not metabolized.

FOSs can be manufactured by the bioconversion of sucrose, i.e., by enzymatic treatment of sucrose. Glucosyltransferases can be used to catalyze the transfer of glucosyl residues from a donor molecule to a particular acceptor. A suitable glucosyltransferase is dextransucrase which is a bacterial extracellular glucosyltransferase produced by *Leuconostoc* strains that promotes dextran synthesis. Fructose is a natural side product released when the enzyme polymerizes glucose from sucrose into dextran. The same enzyme is also responsible for the synthesis of prebiotic oligosaccharides through the acceptor reaction. In the presence of sucrose the introduction of other carbohydrates (acceptors) shifts the enzyme pathway from dextran synthesis toward the production of oligosaccharides. This shifted pathway has been called acceptor reaction. Besides *Leuconostoc* strains, dextransucrase can be also obtained from other types of lactic bacteria—*Streptococcus* and *Lactobacillus*.

Accordingly, in the bioconversion step the HMWN-rich fraction 16 is contacted with a sufficient amount of at least one transglycosidase, one fructosyltransferase, or a combination of at least one transglycosidase and at least one fructosyltransferase (either simultaneously or sequentially) under conditions sufficient to enzymatically convert the intrinsic sugars (sucrose, glucose, and fructose) in the HMWN-rich fraction 16 to non-digestible oligosaccharides, thus reducing intrinsic sugar content of the HMWN-rich fraction 16 to provide a more nutritional food product.

As noted above, useful fructosyltransferases (FT) are classified as EC.2.4.1.99 and exhibit transferase activity. Such enzymes are sometimes also called beta-fructofuranosidase. Beta-fructofuranosidase also include hydrolytic enzymes classified as EC. 3.2.1.26. The term FT applies to any enzyme capable of catalyzing the transfer reaction.

Fructosyltransferases may be derived from plant sources, fungal sources or bacterial sources. Plant sources include, but are not limited to, asparagus, sugar beet, onions, Jerusalem artichokes and others. Fungal sources include, but are not limited to, *Aspergillus, Aureobasidium* and *Fusarium*. More specific examples include *Aspergillus japonicus*, such as CCRC 38011; *Aspergillus niger*, such as ATCC 20611; *Aspergillus foetidus* (such as NRRL 337); *Aspergillus aculeatus; Aureobasidium, pullulans*. Bacterial sources include, but are not limited to, *Arthrobacter*. Commercially available sources are available.

In one embodiment the at least one transglycosidase comprises a glucosyltransferase and more specifically may comprise a dextransucrase. Dextransucrase can be prepared from *Leuconostoc* strains such as *mesenteroides* or *citreum*. Besides *Leuconostoc* strains, dextransucrase can be also obtained from other types of lactic bacteria: *Streptococcus* and *Lactobacillus*.

In some embodiments, the fructosyltransferase and the glucosyltransferase may contact the HMWN-rich fraction 16 simultaneously. In other preferred embodiments, the fructosyltransferase and the glucosyltransferase may contact the HMWN-rich fraction 16 sequentially by forming a reduced sucrose fraction 30 (also referred to as the HMWN-rich oligosaccharide fraction) by first contacting the HMWN-rich fraction 16 with a sufficient amount of the fructosyltransferase under conditions sufficient to enzymatically convert at least some of the intrinsic sugars in the food product to non-digestible fructo-oligosaccharides while also forming glucose; and then contacting the reduced sucrose HMWN-rich fraction with a sufficient amount of the glucosyltransferase under conditions sufficient to enzymatically produce gluco-oligosaccharides while reducing glucose and further reducing sucrose in the HMWN-rich fraction, thus reducing the intrinsic sugar content of the resulting HMWN-rich oligosaccharide fraction 30.

In other embodiments, the fructosyltransferase and the glucosyltransferase may contact the HMWN-rich fraction 16 sequentially by forming a reduced sucrose HMWN-rich fraction by first contacting the HMWN-rich fraction 16 with a sufficient amount of the glucosyltransferase under conditions sufficient to enzymatically convert at least some of the intrinsic sugars in the HMWN-rich fraction 16 to gluco-oligosaccharides while reducing glucose and sucrose in the HMWN-rich fraction 16; and then contacting the reduced sucrose HMWN-rich fraction with a sufficient amount of the fructosyltransferase under conditions sufficient to enzymatically convert at least some of the intrinsic sugars in the HMWN-rich fraction to non-digestible fructo-oligosaccharides while also forming glucose, thus reducing the intrinsic sugar content of the resulting HMWN-rich oligosaccharide fraction 30.

In one embodiment, the HMWN-rich fraction 16 is contacted with fructosyltransferase. The fructosyltransferase may be used in a soluble form or the enzyme may be immobilized by any number of techniques known in the art and these include adsorption on a carrier or other known techniques. Immobilization of the enzyme may allow for the economic use of high enzyme dosage and may eliminate or reduce the need for removal or inactivation of residual enzyme from the product. Soluble enzymes may be optionally inactivated by pasteurization or other known methods. The amount of fructosyltransferase used in the bioconversion step 110 will vary depending on a number of variables. These variables include, but are not limited to, the HMWN-rich fraction 16 present in the bioconversion step; the amount of FOS to be produced; and the treatment time. One of skill in the art will readily be able to determine the amount of fructosyltransferase to be used in the bioconversion step 110.

Further, as known in the art, enzyme dose and reaction time are inversely proportional, and therefore it is useful to calculate the product of dose and reaction time as a measure of the degree of reaction. For example, two hours at a dose of one unit per gram of sucrose (dose×time=2 Uhrs/g) is about equal to one hour of reaction at a dose of 2 U/g (also 2 Uhrs/g). In some embodiments, a dose time of about 0.5 Uhrs/g to 400 Uhrs/g may be required to convert sucrose to FOS. In other embodiments the dose time may be about 0.5 Uhrs/g to 200 Uhrs/g; also about 1 Uhrs/g to 100 Uhrs/g; and further about 1 Uhrs/g to 50 Uhrs/g.

While under some conditions a low dose time may be required (e.g. around 1 to 2 Uhrs/g) under other conditions a greater dose time may be required to provide the same degree of conversion. For example, when the pH of the HMWN-rich fraction 16 is acidic, the fructosyltransferase may be less active and a greater dose time will be required. In some non-limiting examples a dose time of about 200 Uhrs/g to or greater may be required for the enzymatic conversion by a fructosyltransferase process under acidic conditions.

In some embodiments, the FOS producing reaction will proceed under a large range of temperature conditions, and this may be a function of time. In some embodiments, the temperature range is about −10° C. to 95° C., about −5° C. to 90° C., about 1° C. to 80° C., about 1° C. to 75° C.; about 1° C. to 70° C.; about 5° C. to 65° C., about 5° C. to 60° C., about 5° C. to 55° C., about 10° C. to 50° C.; about 5° C. to 40° C.; and about 10° C. to 40° C. In other embodiment, the temperature range will be about −10° C. to about 10° C. In other embodiments, the FOS producing reaction will proceed under pH conditions in the range of about pH 3 to 8; about pH 3 to 7; about pH 3 to 6 and about pH 3.5 to 6. In some embodiments, the FOS producing reaction will proceed under pH conditions of about pH 3 to 4.5 for HMWN-rich fractions 16 obtained from orange juice or apple juice.

The contacting can proceed for as little as 1 minute or for as long as several days or weeks. In some embodiments the contacting will occur for 30 minutes to 48 hours. In other embodiments, the contacting may continue during the shipping and storage of the food product prior to consumption. Generally the sucrose is enzymatically converted to FOS in about 1 minute to 60 hours.

In some embodiments, the suitable contacting conditions may be different from the conditions considered optimum for enzyme activity, particularly to maintain organoleptic qualities, and it may be necessary to adjust time of contacting and fructosyltransferase enzyme dosage. As one non-limiting example, the activity of a fructosyltransferase that has an optimum at about pH 5.5 and about 60° C., will be slowed when contacted with HMWN-rich fractions 16 obtained from orange juice at about pH 3.6 and about 5° C., so as to essentially maintain the quality of the food product, which includes, e.g., texture, taste, color and odor. Time of contacting and enzyme dosage adjustments are within the skill of one in the art.

Methods well known in the art are available for determining the level of FOS in a food product. A direct method of measuring FOS is by HPLC. Other methods include chromatography and NMR. In the absence of a hydrolytic reaction, the formation of each FOS bonds leads to the release of a glucose molecule which may be measured by a wide variety of method including the glucose oxidase based blood glucose test strips.

When FOS production reached its maximum, the reaction may be terminated by conditions leading to denaturation of the fructosyltransferase, such as heat or pasteurization or by physically removing the enzyme in the case of immobilized fructosyltransferase.

The fructosyltransferase enzymatically converts sucrose into a FOS. A FOS containing 2 fructose residues is abbreviated GF2 (G is for glucose and F is for fructose). A FOS containing 3 fructose resides is abbreviated GF3 and those having 4 fructose residues are abbreviated GF4. GF2 is also known as 1-kestose, GF3 is also known as nystose. In some embodiments, the FOS level in the sucrose-reduced HMWN-rich fraction 30 will be increased by at least 0.5%, 1%, 5%, 10%, 15%, 20%, 25%, 30%, 40%, 50%, 75%, 80%, 85%, 90%, 95%, 100%, 200%, 300% and greater as compared to the HMWN-rich fraction 16 before the bioconversion step. However, typically, a corresponding HMWN-rich fraction 16 before the bioconversion step typically does not contain FOSs or contains less than 1% (e.g., between 0 to 1% and 0 to 0.5%) FOSs. In some embodiments, at least 20%, 25%, 30%, 40%, 45%, 50%, 55% and 60% of the FOS produced in the sucrose-reduced HMWN-rich fraction 30 comprises GF2. In some embodiments, the increase in the FOS level take place between 15 minutes to 62 hours (e.g., between 15 minutes and 48 hours, between 15 minutes and 36 hours, and between 30 minutes and 24 hours).

In other embodiments, between 100% and 20% of the sucrose in the HMWN-rich fraction 16 will be enzymatically converted to FOS by the bioconversion step. In some embodiments, at least 40%, at least 50%, at least 60%, and also at least 70% of the sucrose in the HMWN-rich fraction 16 will be converted to FOS by the bioconversion step. In some embodiments, the enzymatic conversion of sucrose to FOS will occur in the range of between 15 minutes to 62 hours (e.g., between 15 minutes and 48 hours, between 15 minutes and 36 hours and between 30 minutes and 24 hours).

Thereafter or simultaneously, glycosyltransferase, e.g., dextransucrase is applied to provide significantly increased gluco-oligosaccharides content. The mixture of the HMWN-rich fraction 16 and the dextransucrase is held for a time and at a temperature effective to convert at least about 30 percent of the sucrose present in the food product, such as about 0.25 to about 72 hours at about 20 to about 40° C., preferably for about 0.5 to about 16 hours at about 30 to about 40° C., although the precise conditions should be selected based on the optimum conditions for the particular dextransucrase enzyme or combination of enzymes used. In some embodiments, the gluco-oligosaccharide producing reaction will proceed under a large range of temperature conditions, and this may be a function of time. In some embodiments, the temperature range is about −10° C. to 95° C., about −5° C. to 90° C., about 1° C. to 80° C., about 1° C. to 75° C.; about 1° C. to 70° C.; about 5° C. to 65° C., about 5° C. to 60° C., about 5° C. to 55° C., about 10° C. to 50° C.; about 5° C. to 40° C.; and about 10° C. to 40° C. In other embodiment, the temperature range will be about −10° C. to about 10° C. The gluco-oligosaccharides produced are characterized by methods known to a person of ordinary skill in the art, for example, by detecting its degree of polymerization with Thin Layer Chromatography (TLC) or by HPLC analysis.

The amount of dextransucrase used in the bioconversion step will vary depending on a number of variables. These variables include but are not limited to, the HMWN-rich fraction 16 present in the bioconversion step; the amount of gluco-oligosaccharides to be produced; the treatment time; and other process conditions. One of skill in the art will readily be able to determine the amount of dextransucrase to be used in the process according to the invention.

Alternatively, dextransucrase is first applied to the HMWN-rich fraction 16, followed by fructosyltransferase, to provide a sucrose reduced HMWN-rich fraction 30 (with an intrinsic sugar content reduced) when compared with the untreated HMWN-rich fraction 16. In this case, dextransucrase may be inactivated before application of fructosyltransferase, for instance by pasteurization or other known methods.

In some embodiments, the sucrose level in the HMWN-rich fraction 16 may be reduced by at least 5%, 10%, 15%, 20%, 25%, 30%, 35%, 40%, 45%, 50%, 55%, 60%, 65%, 70%, 75%, 80%, 85%, 90%, and 95% as compared to the corresponding HMWN-rich fraction 16 before the bioconversion step. In some embodiments, the amount of sucrose will be reduced by more than 50%, and in other embodiments, the amount of sucrose will be reduced by more than 90% as compared to the corresponding HMWN-rich fraction 16 before the bioconversion step. In some embodiments, the sucrose-reduced HMWN-rich fraction 30 produced by the bioconversion step will include about 0.5%, 1%, 2%, 5%, 10%, 20%, 30%, 40%, 50%, 60%, 70%, 80%, 90% sucrose.

In some embodiments, the glucose level, in the HMWN-rich fraction after the bioconversion step in which there is contact with dextransucrase (i.e., the sucrose-reduced HMWN-rich fraction 30), may be reduced by at least 5%, 10%, 15%, 20%, 25%, 30%, 35%, 40%, 45%, 50%, 55%, 60%, 65%, 70%, 75%, 80%, 85%, 90%, and 95% as compared to the corresponding HMWN-rich fraction 16 before the bioconversion step.

It is also contemplated that the bioconversion step includes terminating the first enzymatic reaction, i.e. the fructosyltransferase enzymatic reaction, or the glucosyltransferase enzymatic reaction before contacting the food product with the second enzyme, i.e. glucosyltransferase, or fructosyltransferase respectively. Alternatively, the second enzymatic reaction, i.e. the glucosyltransferase enzymatic reaction, or the fructosyltransferase enzymatic reaction respectively, may be terminated after the reduced sucrose HMWN-rich fraction 30 is obtained.

In one embodiment, the enzymes may be immobilized on a support prior to contacting the HMWN-rich fraction 16 such that the enzymatic reaction can be terminated by removing either the immobilized enzymes from contact with the reduced sucrose HMWN-rich fraction 30 or by removing the reduced sucrose HMWN-rich fraction 30 from contact with the enzymes.

In these embodiments of the bioconversion step, the sucrose content of the food product can be reduced by at least 10%, and preferably by at least 40%, after exposure to dextransucrase exposure, or at least 30%, and preferably at least 70%, after exposure to both fructosyltransferase and glucosyltransferase, as compared to a HMWN-rich fraction 16 (or a feed juice 10) that is not subjected to such exposure. In these embodiments of the bioconversion step, the sugar conversion to non-digestible oligosaccharides is at least 10% after exposure to fructosyltransferase and glucosyltransferase as compared to a corresponding HMWN-rich fraction 16 (or a feed juice 10) which is not subjected to such exposure. In these embodiments of the bioconversion step, the resulting sucrose reduced HMWN-rich fraction 30, contains at least 10% non-digestible oligosaccharides based on the dry weight of the food product, after exposure to fructosyltransferase and glucosyltransferase.

Thereafter, the reduced sucrose HMWN-rich fraction 30 may be combined as discussed above in the mixing vessel 130 with the solids-rich fraction 12.

In an alternative embodiment, which is not shown, the clarified juice 14 is directed to a bioconversion unit 110 to convert the sugars to non-digestible oligosaccharides and the effluent of the bioconversion unit 110 is directed to a separations unit 106 to provide a retentate and a permeate. In this embodiment, the retentate includes a HMWN-rich and oligosaccharide rich fraction and the permeate includes a HMWN-depleted fraction. The retentate can then be combined with the solids-rich fraction 12 to provide a reduced calorie, fiber and nutrient enriched liquid.

In another embodiment, the reduced sucrose HMWN-rich fraction 30 can be subjected to subsequent diafiltration (not shown) to further concentrate the high molecular weight nutrients (and decrease the sugar content). For example, the diafiltration can accomplished by feeding a portion of the reduced sucrose HMWN-rich fraction 30 into a vessel for mixing with a diluent. The diluent may be pure water or the HMWN-depleted fraction 18. The diluted reduced sucrose HMWN-rich fraction 30 can then be subjected to a nanofiltration step (not shown) similar to that described above. Two or more diafiltration steps may be added in series with each successive diafiltration treatment further concentrating or purifying the high molecular weight nutrients.

It is contemplated that the concentrated or purified high molecular weight nutrients could be combined with the solids-rich fraction or could be used in other food products or beverages to provide nutrients.

Figure 3:
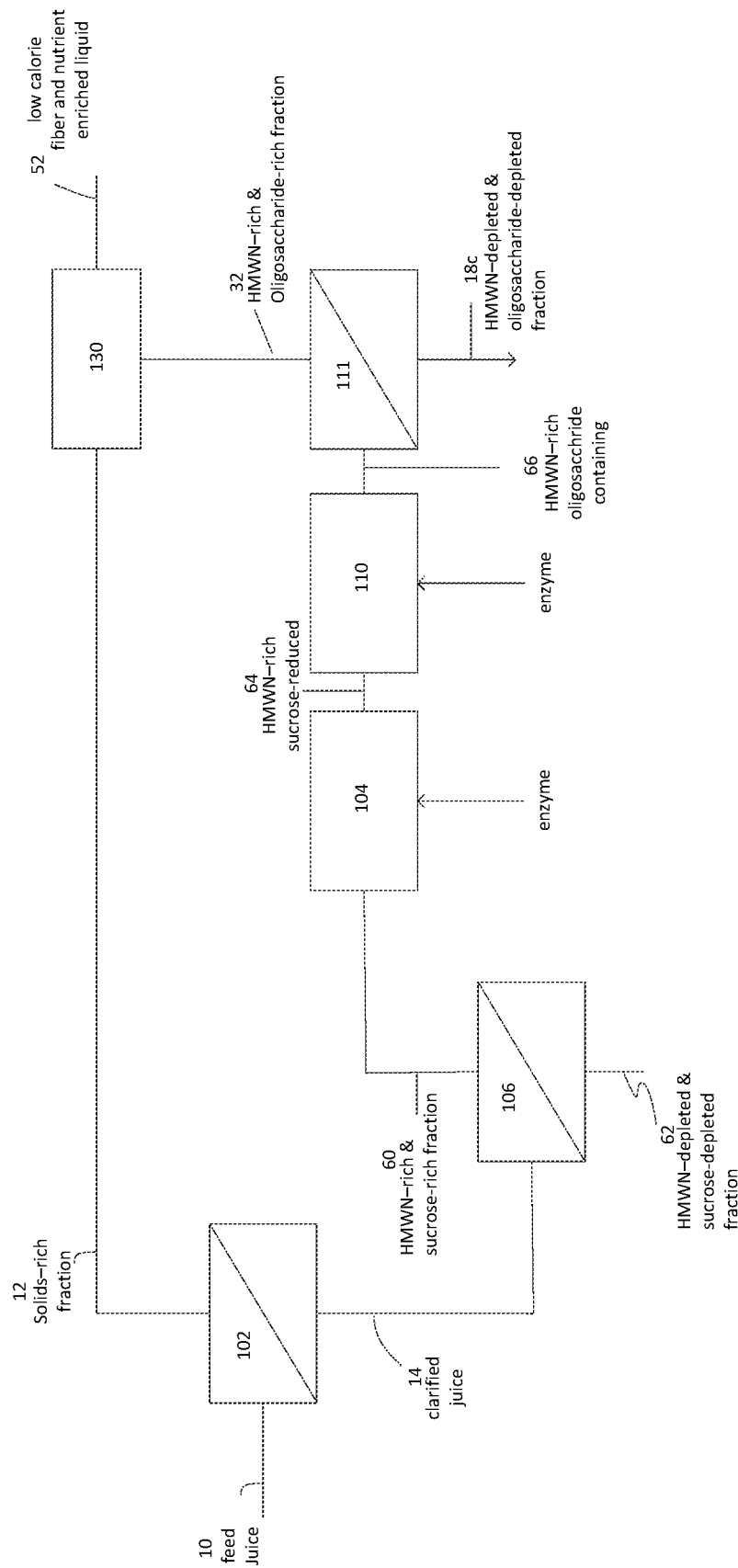
FIG. 3 is a flowchart of a process for creating a reduced calorie, fiber and nutrient enriched liquid from a feed juice stream according to one embodiment.

Turning now to FIG. 3, an alternative embodiment for creating a reduced calorie, fiber, and nutrient enriched liquid. In this embodiment, a feed juice stream 10 is separated into a solids-rich fraction 12 and a clarified juice fraction 14. The clarified juice fraction 14 is directed to a separator 106, for example, a nanofiltration unit to provide a retentate and a permeate. The retentate contains a HMWN-rich and sucrose-rich fraction 60. The permeate contains a HMWN-depleted and sucrose-depleted fraction 62.

The nanofiltration may be accomplished with a membrane having a molecular weight cutoff between 190-210 Daltons, or between 195-205 Daltons. In a particular embodiment, the pore size of the membrane is about 0.0001 microns which corresponds to a molecular weight cutoff of about 200 Daltons.

Thereafter, the HMWN-rich and sucrose-rich fraction 60 may be directed to a hydrolysis reactor 104 where the HMWN-rich and sucrose-rich fraction 60 is enzymatically treated to hydrolyze the disaccharides to monosaccharides in the same manner as described above. The result of the hydrolysis reaction is to produce a HMWN-rich fraction with content of sucrose that is reduced as compared to the clarified juice 12 (due to the hydrolysis of sucrose to fructose and glucose).

In one embodiment, the sucrose-reduced HMWN-rich fraction 64 can be combined with the solids-rich fraction 12 to provide a lower calorie nutrient enriched beverage. The fractions can be combined in any known manner such as a mixing valve, a tank, or any other equipment to provide the desired amounts of solids-fraction 12 and sucrose-reduced HMWN-rich fraction 64.

In one embodiment, the sucrose-reduced HMWN-rich fraction 64 can be directed to the bioconversion unit 110, where the sugars are converted to non-digestible oligosaccharides in the same manner as described above. Alternatively, the HMWN-rich and sucrose-rich fraction 60 is not hydrolyzed but is instead sent directly to the bioconversion unit 110, where the sugars are converted to non-digestible oligosaccharides in the same manner as described above.

The resulting HMWN-rich oligosaccharide containing stream 66 is directed to a separator 111 to provide a retentate and a permeate. The retentate includes a HMWN-rich and oligosaccharide-rich fraction 68 that can be combined with the solids-rich fraction 12 in a mixing unit 130 as described above, to produce a reduced calorie, fiber and nutrient enriched liquid 52.

It is contemplated that the HMWN-rich and oligosaccharide-rich fraction 68 can be subjected to subsequent diafiltration (not shown) to further concentrate the high molecular weight nutrients (and decrease the sugar content). For example, the diafiltration can accomplished by feeding a portion of the HMWN-rich and oligosaccharide-rich fraction 68 into a vessel for mixing with a diluent. The diluent may be pure water, the HMWN-depleted fraction 18, the HMWN-depleted and oligosaccharide depleted fraction 18c and various combinations of these streams. The diluted HMWN-rich and oligosaccharide-rich fraction 68 can then be subjected to a nanofiltration step (not shown) similar to that described above to concentrate the high molecular weight nutrients and oligosaccharides. Two or more diafiltration steps may be added in series with each successive diafiltration treatment further concentrating or purifying the high molecular weight nutrients and oligosaccharides.

It is contemplated that the concentrated or purified high molecular weight nutrients (and oligosaccharides) could be combined with the solids-rich fraction or could be used in other food products or beverages to provide nutrients.

The permeate includes a HMWN-depleted and oligosaccharide depleted fraction 18c that may contain sugars that have not been converted to oligosaccharides. This HMWN-depleted and oligosaccharide-depleted fraction 18c may be combined with the HMWN-depleted fraction 62 obtained by the separator 106 and used in other processes or as an additive to other foods or beverages.

It will be appreciated that the reduced calorie nutrient enriched liquid 52 will have a ratio of nutrients to sugars that is greater than the feed juice. The HMWN-depleted fraction can be disposed of or processed further as will be described later.

Figure 4:
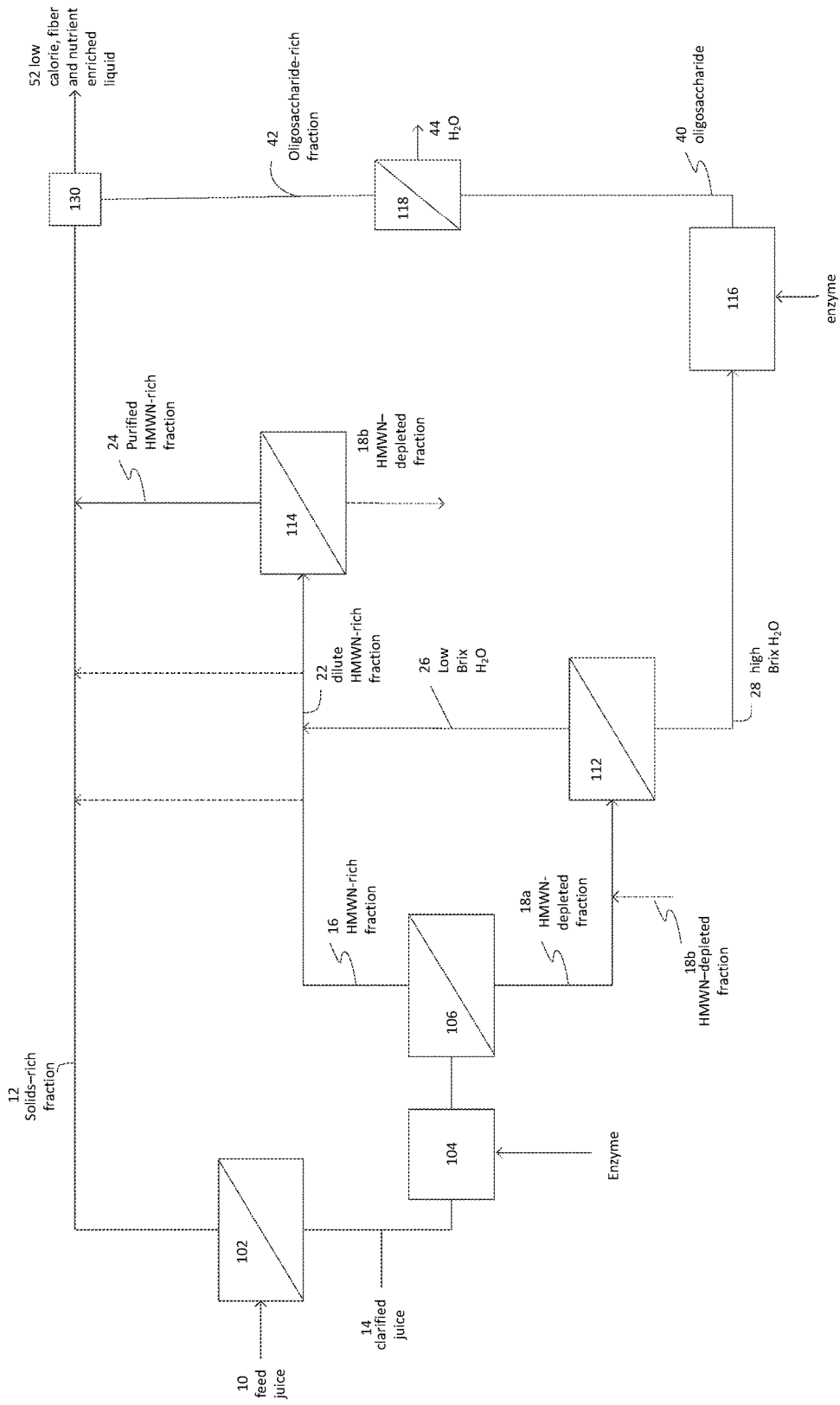
FIG. 4 is a flowchart of a process for creating a reduced calorie, fiber and nutrient enriched liquid from a feed juice stream according to another embodiment.

Turning now to FIG. 4 another embodiment of the process is shown. It will be appreciated that certain portions of the process described above in connection with FIG. 1 are included in the process shown in FIG. 4.

Accordingly, as noted above, a feed juice stream 10 is separated in the first separator 102 into a solids-rich fraction 12 and a clarified juice fraction 14. The clarified juice fraction 14 may be treated in a hydrolysis reactor 104 to hydrolyze sucrose to glucose and fructose and the hydrolyzed clarified juice fraction is then directed to a second separations unit 106 to provide a retentate and a permeate. The retentate includes the HMWN-rich fraction 16 and remaining sucrose (as well as glucose and fructose) while the permeate includes a HMWN-depleted fraction, glucose, and fructose 18a.

The HMWN-rich fraction 16 may be combined with the solids-rich fraction 12 or may be combined with a low brix water 26 stream as described below.

The permeate of the second separations unit 106 is directed to a third separations unit 112, which will typically be a reverse osmosis unit where the retentate includes a glucose and sucrose rich fraction 28 (a high brix fraction) and the permeate is substantially water (a low brix fraction 26). The low brix fraction 26 may be disposed of, used in other operations, used as a supplement or diluent in other portions of the process. Alternatively, as noted above, the low brix fraction 26 can be combined or mixed with the HMWN-rich fraction 16 to form a dilute HMWN-rich fraction 22. The dilute HMWN-rich fraction 22 may be combined with the solids rich fraction 12. Alternatively, dilute HMWN fraction 22 may be treated in a fourth separations unit 114, such as a nano-filtration unit to provide a retentate that is a purified HMWN-rich fraction 24 that may be combined with the solids-rich fraction 12.

The nanofiltration may be accomplished with a membrane having a molecular weight cutoff between 190-210 Daltons, or between 195-205 Daltons. In a particular embodiment, the pore size of the membrane is about 0.0001 microns which corresponds to a molecular weight cutoff of about 200 Daltons.

The permeate from the fourth separations unit 114 will be a HMWN-depleted fraction 18b that may be combined with the HMWN-depleted fraction 18a from the second separations unit 106 and then directed to the third separations unit 112 and processed as described above.

The retentate from the third separations unit 112, i.e., the high brix water fraction 28 may be directed to a second bioconversion unit 116, where the sugars can be bioconverted into non-digestible oligosaccharides in the same manner as described above. The resulting oligosaccharide stream 40 may be directed to a fifth separations unit to provide a retentate that contains an oligosaccharide-rich fraction 42 and an oligosaccharide-depleted fraction 44. The oligosaccharide-rich fraction 42 may be combined at mixer 130 with the solids-rich fraction and the purified HMWN-rich fraction 24 to create a reduced calorie, fiber and nutrient enriched liquid.

Figure 5:
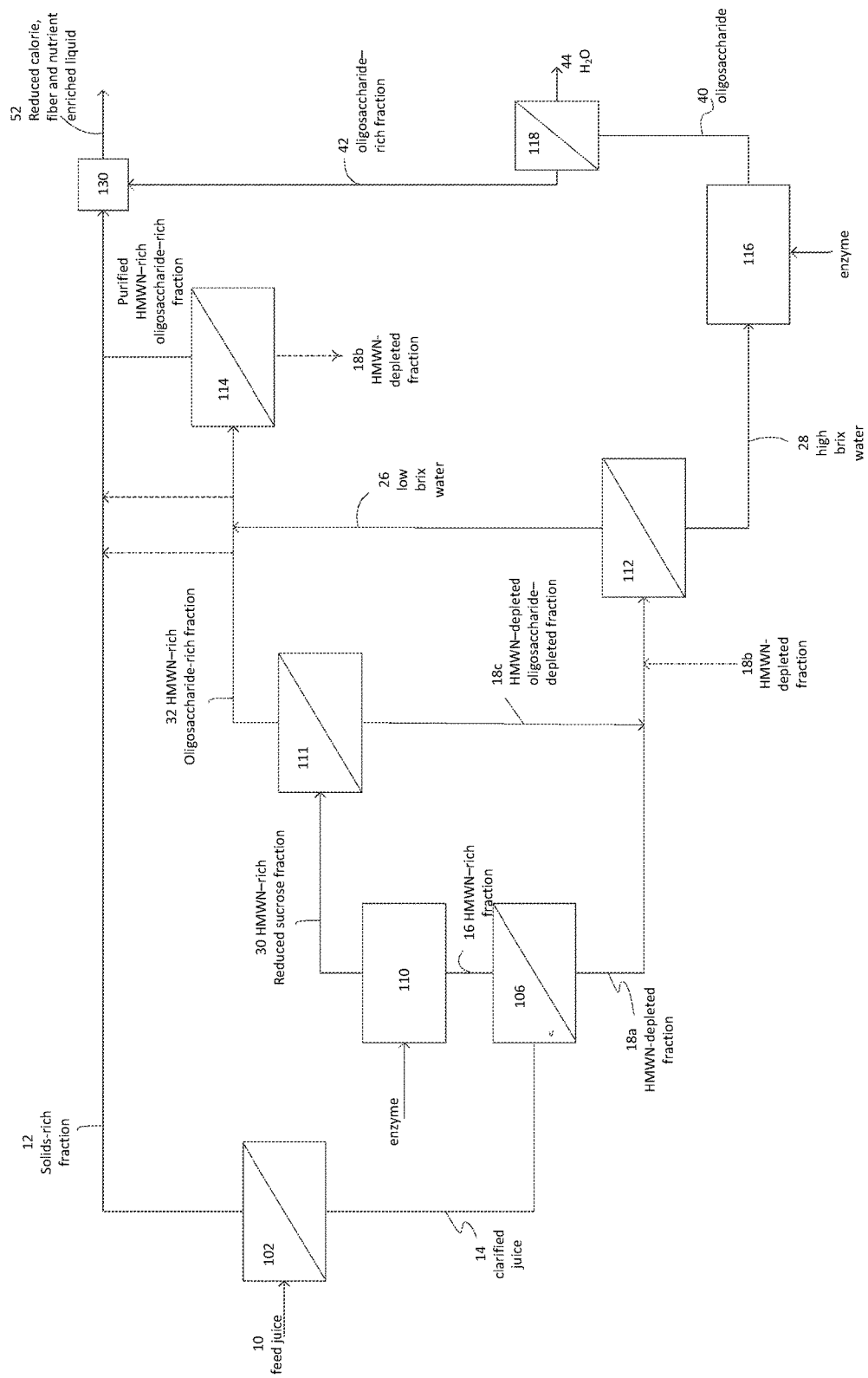
FIG. 5 is a flowchart of a process for creating a reduced calorie, fiber and nutrient enriched liquid from a feed juice stream according to another embodiment.

Turning now to FIG. 5, another embodiment is shown. A feed juice stream 10 is separated in the first separator 102 into a solids-rich fraction 12 and a clarified juice fraction 14. The clarified juice fraction 14 is directed to a separations unit 106 to provide a retentate and a permeate. The retentate includes a HMWN-rich fraction 16 and the permeate includes a HMWN-depleted fraction 18a.

The HMWN-rich fraction 16, which also contains a greater amount of sucrose as compared to the HMWN-depleted fraction 18a, is directed to a bioconversion unit 110 where the sucrose is converted to non-digestible oligosaccharides. The effluent of the bioconversion unit 110 is directed to a separator 111 to provide a retentate and a permeate. The retentate includes a HMWN-rich fraction and an oligosaccharide-rich fraction 32 while the permeate includes a HMWN-depleted and oligosaccharide-depleted fraction 18c.

The HMWN-rich and oligosaccharide-rich fraction 32 may be mixed or combined with the solids-rich fraction 12 or may be combined with a low brix water 26 stream as described below.

The HMWN-depleted and oligosaccharide-depleted fraction 18c, which is the permeate of the separator 111, may be combined with permeate of the second separations unit 106 and thereafter directed to a third separations unit 112, which will typically be a reverse osmosis unit where the retentate includes a glucose and sucrose rich fraction 28 (a high brix fraction) and the permeate is substantially water (a low brix fraction 26). The low brix fraction 26 may be disposed of, used in other operations, used as a supplement or diluent in other portions of the process.

Alternatively, as noted above with respect to FIG. 4, the low brix fraction 26 can be combined or mixed with the HMWN-rich and oligosaccharide-rich fraction 32 to form a dilute HMWN-rich fraction and oligosaccharide-rich fraction. The dilute HMWN-rich fraction and oligosaccharide-rich fraction may be combined with the solids rich fraction 12. Alternatively, the dilute HMWN-rich fraction and oligosaccharide-rich fraction may be treated in a fourth separations unit 114, such as a nano-filtration unit to provide a retentate that is a purified HMWN-rich and oligosaccharide-rich fraction that may be combined with the solids-rich fraction 12.

The nanofiltration may be accomplished with a membrane having a molecular weight cutoff between 190-210 Daltons, or between 195-205 Daltons. In a particular embodiment, the pore size of the membrane is about 0.0001 microns which corresponds to a molecular weight cutoff of about 200 Daltons.

The permeate from the fourth separations unit 114, which is a HMWN-depleted fraction 18b, it may also be combined with the HMWN-depleted fraction 18a from the second separations unit 106 and then directed to the third separations unit 112 and processed as described above.

Referring now to the retentate from the third separations unit 112, i.e., the high brix water fraction 28, it may be directed to a second bioconversion unit 116, where the sugars can be bioconverted into non-digestible oligosaccharides in the same manner as described above. The resulting oligosaccharide stream 40 may be directed to a fifth separations unit 118 to provide a retentate that contains an oligosaccharide-rich fraction 42 and an oligosaccharide-depleted fraction 44. The oligosaccharide-rich fraction 42 may be combined at mixer 130 with the solids-rich fraction and the purified HMWN-rich fraction 24 to create a reduced calorie, fiber and nutrient enriched liquid.

The term "sucrose" means a disaccharide comprised of 1 mole of D-glucose and 1 mole of D-fructose wherein the C-1 carbon atom of the glucose and the C-2 carbon atom of the fructose participate in the glycoside linkage.

The term "endogenous" as used with reference to sucrose or fiber refers to sucrose or fiber that is naturally contained in a food product (native or intrinsic sucrose or fiber).

The term "disaccharide" refers to any compound that comprises two covalently linked monosaccharide units. The term encompasses but is not limited to such compounds as sucrose, lactose and maltose.

The term "oligosaccharide" refers to a compound having 2 to 10 monosaccharide units joined by glycosidic linkages.

The term "fructo-oligosaccharides" and "fructooligosaccharides (FOS) means short chain oligosaccharides comprised of D-fructose and D-glucose units. Some FOSs are short chain molecules with no more than 6 fructose residues. For example some FOSs comprise of one molecule of D-glucose in the terminal position and from 2 to 4 D-fructose units having the structural formula below wherein n=2-4 fructose residues. The linkage between fructose residues in FOSs are beta-(2-1) glycosidic links.

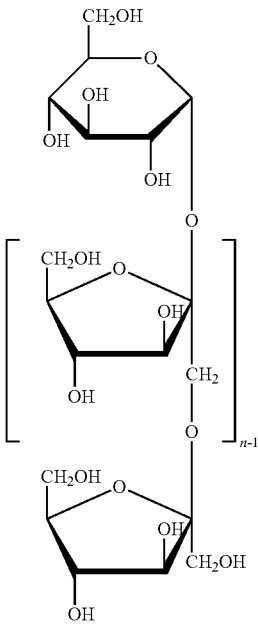

The term "fructosyltransferase (FT)" means enzymes having fructose transferase activity that are capable of producing fructo-oligosaccharides in the presence of sucrose. Enzymes having fructose transferase activity have been classified as E.C. 2.4.1.99 (sucrose:sucrose fructosyltransferases) and E.C. 3.2.1.26 (beta-D-fructofuranosidases or beta-fructosidases).

The term "gluco-oligosaccharides" (GOS) means short chain molecules with 2 to 10 glucose residues. The linkage between glucose residues in gluco-oligosaccharides are α-1,2 and α-1,6 glucosidic bonds.

The term "dextransucrase" means enzymes having glucose transferase activity that are capable of producing dextran in the presence of sucrose and prebiotic oligosaccharides in the presence of an acceptor such as glucose and maltose among others. Enzymes having glucose transferase activity have been classified as E.C. 2.4.1.5.

The term "transglycosidase" means enzymes that catalyze the transfer of a glycosyl donor to an acceptor molecule forming a new glycosidic bond region- and stereo-specifically. Enzymes having glycosidic transfer activity have been classified as E.C. 2.4.

The term "non-digestible carbohydrate" means long chain molecules with more than 10 monosaccharide units that could consist of hundreds or thousands units that resist hydrolysis of digestive enzymes. Levan is a non-digestible carbohydrate recognized as fructan that comprise predominantly β-2,6 glycosidic bonds between adjacent fructose units.

The term "non-digestible oligosaccharides (NDOs)" means short chain molecules with 2 to 10 monosaccharide units that resist hydrolysis of digestive enzymes, but are preferentially utilized in the colon by Bifidobacteria and/or lactobacilli.

A "glucose isomerase" (e.g., EC 5.3.1) refers to an enzyme that isomerizes glucose, to fructose (e.g. EC 5.3.1.9).

A "glucose oxidase" (e.g., EC 1.1.3.4) refers to an enzyme that catalyzes the reaction between glucose and oxygen producing gluconate and hydrogen peroxide.

A "levansucrase" (E.C. 2.4.1.10) refers to an enzyme that catalyzes a fructosyl transfer from sucrose to a various acceptor molecules producing mainly levan which consists of D-fructofuranosyl residues linked predominantly by β-2,6 linkage as the main chain with some β-2,1 branching points.

An "enzyme unit" for fructosyltransferase is defined as the amount of enzyme responsible for transferring one micromole of fructose per minute under standard conditions or as the amount of enzyme for producing one micromole of glucose under standard conditions.

An "enzyme unit" for dextransucrase is defined as the amount of enzyme responsible for releasing one micromole of reducing sugar per minute under standard conditions.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method for producing a juice product comprising:
providing a feed juice;
separating the feed juice into a solids-rich fraction and a clarified juice fraction;
processing the clarified juice fraction by passing the clarified juice fraction through a membrane having a molecular weight cutoff between 190 to 210 Daltons to selectively separate high molecular weight nutrients to produce a high molecular weight nutrient (HMWN)-rich juice fraction and a HMWN-depleted fraction wherein the HMWN-rich fraction contains a greater amount of sucrose than the HMWN-depleted fraction;
bioconverting sugars present in the HMWN-rich fraction to form a HMWN-rich, sucrose-reduced fraction, and oligosaccharide-rich fraction.

2. The method of claim 1 further comprising combining the solids-rich fraction with the HMWN-rich, sucrose-reduced fraction, and oligosaccharide-rich fraction.

3. The method of claim 1 further comprising bioconverting sugars present in the HMWN-depleted fraction to form a HMWN-depleted, sucrose-reduced fraction.

4. The method of claim 3 further comprising combining the solids-rich fraction with the HMWN-depleted, sucrose-reduced fraction.

5. The method of claim 1 wherein the bioconverting includes forming oligosaccharides and the method further comprises processing the HMWN-rich, sucrose-reduced fraction to selectively separate oligosaccharides from sugars to produce a HMWN-rich, oligosaccharide-rich fraction.

6. The method of claim 5 further comprising combining the solids-rich fraction with the HMWN-rich, oligosaccharide-rich fraction.

7. The method of claim 5 further comprising purifying the HMWN-rich, oligosaccharide-rich fraction.

8. The method of claim 5 wherein the processing produces a HMWN-depleted, oligosaccharide-depleted fraction.

9. The method of claim 8 wherein the HMWN-depleted fraction and the HMWN-depleted, oligosaccharide-depleted fraction are combined.

10. The method of claim 9 wherein the combined HMWN-depleted fraction and the HMWN-depleted, oligosaccharide-depleted fractions are processed to form a low brix water and a high brix water.

11. The method of claim 10 wherein the low brix water is combined with the HMWN-rich, oligosaccharide-rich fraction.

12. The method of claim 10 further comprising bioconverting the high brix water to form oligosaccharides.

13. The method of claim 12 wherein the oligosaccharides are combined with the solids-rich fraction.

* * * * *